(12) United States Patent
Draper

(10) Patent No.: US 6,705,831 B2
(45) Date of Patent: Mar. 16, 2004

(54) LINKED, MANUFACTURABLE, NON-PLUGGING MICROCIRCUITS

(75) Inventor: Samuel David Draper, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 99 days.

(21) Appl. No.: 10/176,443

(22) Filed: Jun. 19, 2002

(65) Prior Publication Data

US 2003/0235494 A1 Dec. 25, 2003

(51) Int. Cl.$^7$ .................................................. F01D 5/18
(52) U.S. Cl. ...................... 415/115; 416/97 R
(58) Field of Search ...................... 415/115; 416/97 R, 416/96 R, 90 R, 95, 231 R, 231 B, 223 A

(56) References Cited

U.S. PATENT DOCUMENTS

| | | | |
|---|---|---|---|
| 6,247,896 B1 | * | 6/2001 | Auxier et al. ............. 416/97 R |
| 6,254,334 B1 | * | 7/2001 | LaFleur ..................... 416/97 R |
| 6,280,140 B1 | * | 8/2001 | Soechting et al. ........ 416/97 R |

* cited by examiner

*Primary Examiner*—Edward K. Look
*Assistant Examiner*—Richard A. Edgar
(74) *Attorney, Agent, or Firm*—Bachman & LaPointe, P.C.

(57) ABSTRACT

A linked microcircuit for providing coolant gas flow through an aircraft part, comprising at least one inlet through which a coolant gas may enter, a circuit channel extending from the at least one inlet through which the coolant gas may flow wherein the circuit channel is formed from the superimposition of a plurality of alternating serpentine circuits, and at least one outlet appended to the circuit channel through which the coolant gas may exit the circuit channel.

6 Claims, 3 Drawing Sheets

LINKED, MANUFACTURABLE, NON-PLUGGING MICROCIRCUITS

BACKGROUND OF THE INVENTION (1) Field of the Invention

The present invention relates to a linked microcircuit for providing heat dissipation and film protection in moving parts. More specifically, the present invention relates to a linked microcircuit constructed to form a geometry resistant to plugging and providing both ease and superiority of fabrication.

(2) Description of Related Art

As a result of moving at high speeds through gas, moving parts such as turbines employ various techniques to dissipate internal heat as well as provide a protective cooling film over the surface of the part. One such technique involves the integration of cooling channels into the part through which cool gas can flow, absorbing heat energy, and exiting so as to form a protective film.

With reference to FIGS. 1*a* and 1*b*, there is illustrated a cooling channel known to the art. Coolant gas 27 is circulated through the interior of a part and exits as exit gas 28 through a hole 22 permeating the part surface 12. Gas flow 24 is pulled across part surface 12 and is illustrated herein as moving from left to right across part surface 12. Gas flow 24 is usually generated as the result of the part moving, often in a rotary fashion, through a gas. Exit gas 28 exits the hole 22 in a direction that is substantially normal to part surface 12. As exit gas 28 exits the hole 22, it reacts to gas flow 24 and proceeds to move generally in the direction corresponding to the direction in which gas flow 24 is moving. As a result, exit gas 28 is pulled across the part surface 12 and tends to hug closely thereto forming a film 26.

It is therefore advantageous to configure the placement of holes 22 through a part surface 12 such that the resulting film 26, consisting of cool air, forms a protective coating over the part. One configuration known to the art is illustrated in FIG. 1*c*. A plurality of holes 22 are arranged along an axis 20 wherein axis 20 extends generally perpendicular to the direction of gas flow 24. Each hole has a width equal to break out height 16. Pitch 18 is computed as the distance along axis 20 required for a single repetition of a hole 22. Therefore the linear coverage afforded by such a pattern of holes is equal to break out height 16 divided by pitch 18. As defined, coverage increases if the holes are spaced closer together (the pitch decreases) or, maintaining a constant pitch, the width of the holes 22 is increased (the break out height 16 is increased). It is therefore preferable to configure holes 22 in a pattern in such a way that the coverage is maximized. Such a configuration provides for the greatest coverage by film 26 of part surface 12.

In addition to cooling channels formed by simple holes, microcircuits, fabricated into a part, may be used to increase the ability of the coolant gas to absorb a part's internal heat.

Microcircuits offer easy to manufacture, tailorable, high convective efficiency cooling. Along with high convective efficiency, high film effectiveness is required for an advanced cooling configuration. With reference to FIG. 2, there is illustrated a microcircuit 5. Microcircuits 5 may be machined or otherwise molded within a part.

When a plurality of microcircuits is arranged to cover a part's surface, changes in the circuit channel geometry may give rise to preferable cooling properties. With reference to FIG. 4, there is illustrated a plurality of serpentine microcircuits 6. As used herein, "serpentine microcircuit" refers, generally, to a microcircuit which extends over a distance by oscillating back and forth short distances in a transverse motion wherein such transverse motion is generally perpendicular to the overall direction of travel curving first left, then right, in alternating fashion. In order to increase coverage, it would be preferable to decrease the pitch 18 of the arrangement. It would prove most preferable to decrease the pitch to a degree that adjacent serpentine microcircuits 6 touch. However, were the pitch 18 to be so reduced, there would arise the unfortunate effect whereby coolant gas from one serpentine microcircuit 6 would mix with coolant gas from another serpentine microcircuit 6 traveling at a different velocity and having a different density and temperature. Such coolant gas incongruities are the result of gas streams mixing which have traveled paths of varying length and geometry.

For example, coolant gas entering at a point A travels from right to left through a serpentine microcircuit 6 by curving around to the left through point B before continuing straight and turning around to the right to point D. Were the pitch of the serpentine microcircuits 6 to be reduced such that they touched, point D' on the uppermost serpentine microcircuit 6 would come in contact with point B of the adjacent serpentine microcircuit 6. As has been described, coolant gas traveling past point D, and hence D', has traveled through more turns and a greater distance than the coolant gas passing point B. As a result, the properties of the gases passing points B and D' differ.

What is therefore needed is a method of forming a microcircuit composed of a plurality of touching, or superimposed, serpentine microcircuits thus providing a maximal coverage while reducing the incongruity of coolant gas properties present at the junctions of the component serpentine microcircuits.

SUMMARY OF THE INVENTION

Accordingly, it is an object of the present invention to provide an improved microcircuit design for cooling aircraft parts.

In accordance with the present invention, a linked microcircuit for providing coolant gas flow through an aircraft part, comprises at least one inlet through which a coolant gas may enter, a circuit channel extending from the at least one inlet through which the coolant gas may flow wherein the circuit channel is formed from the superimposition of a plurality of alternating serpentine circuits, and at least one outlet appended to the circuit channel through which the coolant gas may exit the circuit channel.

In accordance with the present invention, a method of fabricating an aircraft part with improved cooling flow comprises the steps of fabricating a plurality of microcircuits under a surface of the part, the microcircuits comprising at least one inlet through which a coolant gas may enter a circuit channel extending from the at least one inlet through which the coolant gas may flow wherein the circuit channel is formed from the superimposition of a plurality of alternating serpentine circuits, and at least one outlet appended to the circuit channel through which the coolant gas may exit the circuit channel, and providing a coolant gas to flow into the inlet, through the circuit channel, and out of the slot film hole.

DETAILED DESCRIPTION OF THE PREFERRED EMBODIMENT(S)

Microcircuits may be formed of refractory metals forms and encapsulated in the part mold prior to casting. Several refractory metals including molybdenum (Mo) and Tungsten (W) have melting points that are in excess of typical casting temperatures of nickel based superalloys. These refractory metals can be produced in wrought thin sheet or forms in sizes necessary to make cooling channels characteristic of those found in turbine and combustor cooling designs. Specifically, such microcircuits may be fabricated into parts including, but not limited to, combustor liners, turbine vanes, turbine blades, turbine BOAS, vane endwalls, and airfoil edges. Preferably, such parts are formed in part or in whole of nickel based alloys or cobalt based alloys. Thin refractory metal sheets and foils possess enough ductility to allow bending and forming into complex shapes. The ductility yields a robust design capable of surviving a waxing/shelling cycle.

After casting, the refractory metal can be removed, such as through chemical removal, thermal leeching, or oxidation methods, leaving behind a cavity forming the microcircuit 5.

Figure 1C:
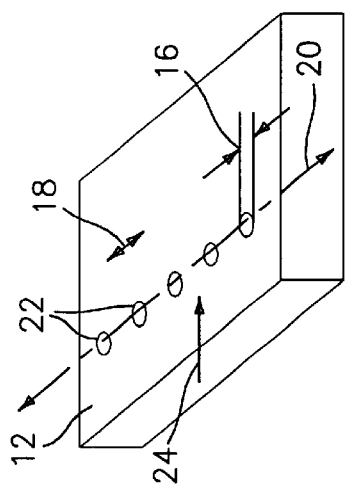
FIG. 1(c) A perspective illustration of a plurality of cooling holes known in the art.
Figure 2B:
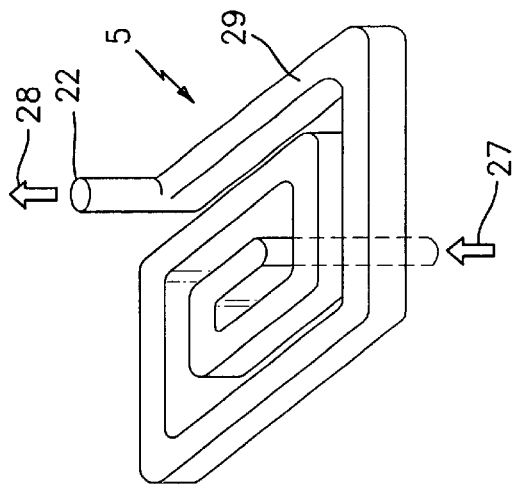
FIG. 2(b) A perspective illustration of a microcircuit for cooling known in the art.
Figure 1B:
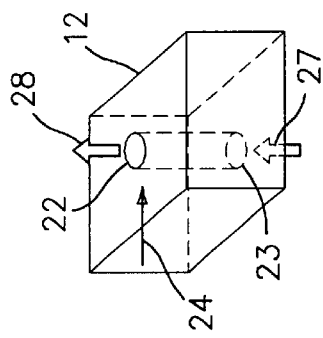
FIG. 1(b) A perspective illustration of a cooling hole known in the art.
Figure 1A:
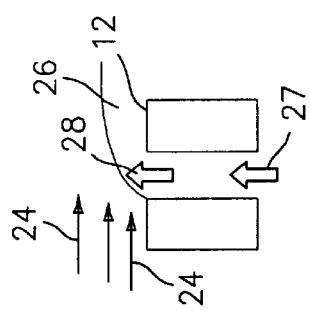
FIG. 1(*a*) A cross-section diagram of a cooling hole known in the art.
Figure 2A:
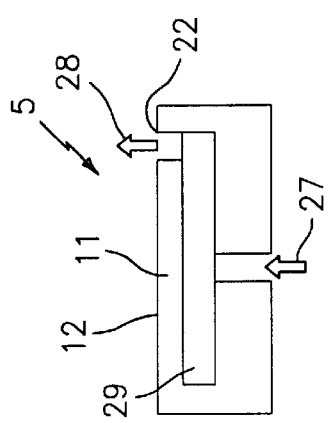
FIG. 2(a) A cross-section diagram of a microcircuit for cooling known in the art.
Figure 3:
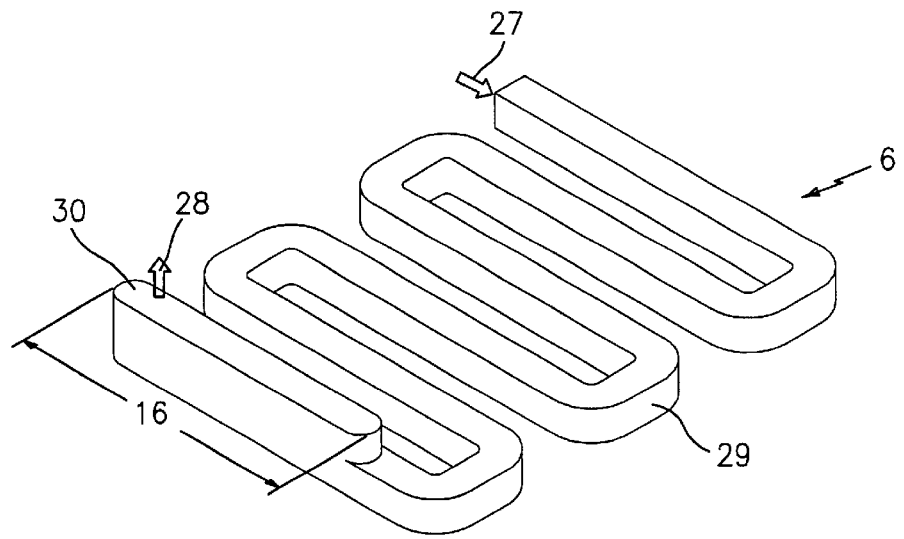
FIG. 3 A perspective illustration of a serpentine microcircuit incorporating a slot film hole.
Figure 4:
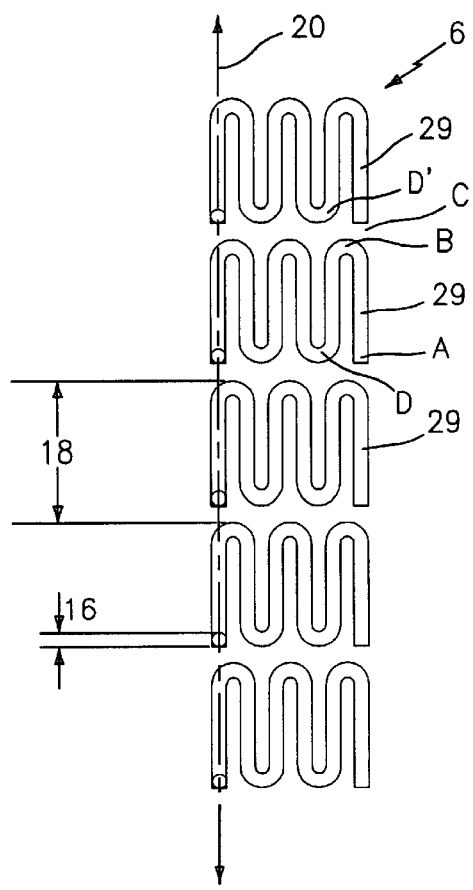
FIG. 4 A diagram of a plurality of serpentine microcircuits known in the art.

With reference to FIG. 3, there is illustrated a serpentine microcircuit 6 comprising a slot film hole 30. A slot film hole 30 forms an opening in the surface of the part into which serpentine microcircuit 6 is fabricated through which the coolant gas may exit. Preferably, slot film hole 30 is formed of a generally linear expanse extending along a portion of circuit channel 29. Because the surface area of slot film hole 30 is larger than the cross sectional area of circuit channel 29, the speed at which coolant gas travels through slot film hole 30 is less than that at which it travels through circuit channel 29. As a result, the exiting coolant gas exits at a reduced speed conducive to avoiding blow-off. In addition, a slot film hole 30 creates a larger break out height 16 than would a hole with a diameter approximately equal to that of circuit channel 29.

Figure 5:
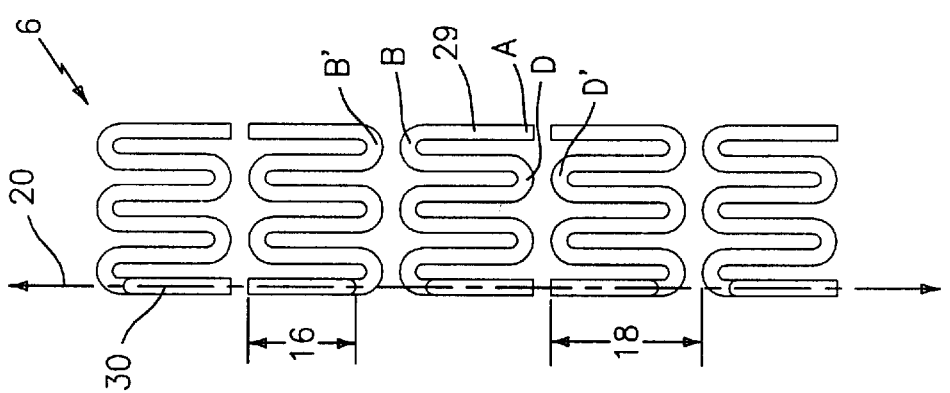
FIG. 5 A diagram of a plurality of alternating serpentine circuits.

With reference to FIG. 5, there is illustrated an embodiment of a plurality of alternating serpentine microcircuits 6 incorporating slot film holes 30. Alternating serpentine microcircuits 6 are arranged along an axis 20 such that each central serpentine microcircuit 6 is bordered by two serpentine microcircuits 6 each of which is a mirror image of the central serpentine microcircuit 6. As a result, were the pitch to be reduced such that adjacent serpentine microcircuits 6 touched, similar features would be superimposed over one another. For example, point B would be coincident with point B'. Point D would be coincident with point D'. Because of the property that similar points along circuit channel 29 would end up as coincident under such a scheme, the properties of the coolant gases present at any one such point joining after traveling through adjacent circuit channels 29 would be nearly identical. The resulting mixing of gases would transpire absent unacceptable incongruities in gas temperature or pressure.

Figure 6:
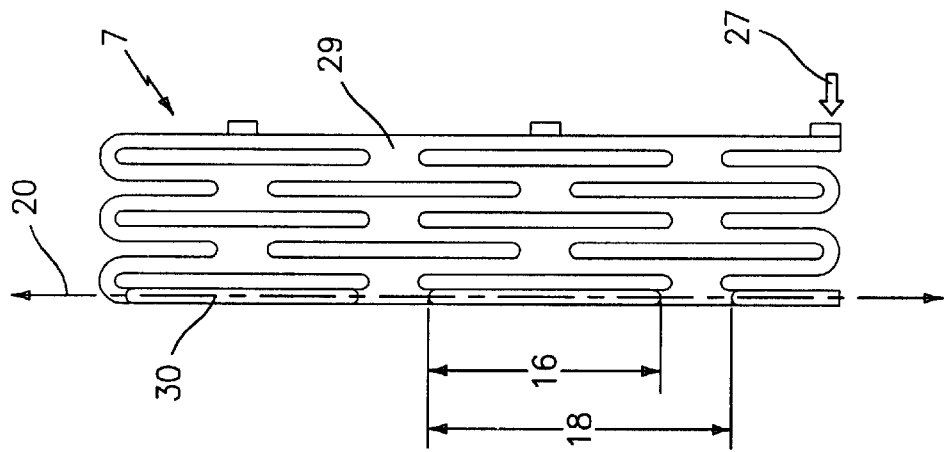
FIG. 6 A diagram of a linked microcircuit according to the present invention.

With reference to FIG. 6, there is illustrated a preferred embodiment of a linked microcircuit 7 of the present invention. Linked microcircuit 7 is formed from the superimposition of alternating serpentine microcircuits wherein the pitch of the alternating serpentine microcircuits is reduced such that adjacent alternating serpentine microcircuits touch. The degree to which the pitch may be reduced to cause superimposition of the alternating serpentine microcircuits when creating linked microcircuit 7 is variable and depends upon the desired coolant gas flow characteristics.

Linked microcircuits may be used to cover the surface of a moving part, such as a turbine or airfoil, with an array of small channels. These channels can be tailored for the local heat load and geometry requirements of the part. The geometry of linked microcircuits provides several advantages over separated microcircuits.

Linked microcircuits reduce the incidence of plugging. The turns in the circuit channels of status circuits form places for dirt to accumulate, especially in the rotating environment of rotating blades. Linked circuits eliminate such turns and, hence, eliminate concern for such accumulation.

Linked miciruits offer advantages during fabrication. Because the linked microcircuits are linked, the core body used to create them will also be linked. This linking will make a more rigid structure for the casting process greatly increasing the chances of casting success.

It is apparent that there has been provided in accordance with the present invention a linked, manufacturable, non-plugging microcircuit and a method of incorporating such microcircuits into parts which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A linked microcircuit for providing coolant gas flow through a part, comprising:
    at least one inlet through which a coolant gas may enter;
    a circuit channel extending from said at least one inlet through which said coolant gas may flow wherein said circuit channel is formed from the superimposition of a plurality of alternating serpentine circuits; and
    at least one outlet appended to said circuit channel through which said coolant gas may exit said circuit channel.

2. The microcircuit of claim 1 wherein said part is of a type selected from group consisting of combustor liners, turbine vanes, turbine blades, turbine BOAS, vane endwalls, and airfoil edges.

3. The microcircuit of claim 1 wherein said part is fabricated from a metal selected from the group consisting of nickel based alloys and cobalt based alloys.

4. The linked microcircuit of claim 1 wherein said at least one outlet is a slot film hole.

5. A method of fabricating a part with improved cooling flow, comprising the steps of:
   fabricating a plurality of microcircuits under a surface of the part, said microcircuits comprising:
   at least one inlet through which a coolant gas may enter;
   a circuit channel extending from said at least one inlet through which said coolant gas may flow wherein said circuit channel is formed from the superimposition of a plurality of alternating serpentine circuits; and
   at least one outlet appended to said circuit channel through which said coolant gas may exit said circuit channel; and
   providing a coolant gas to flow into said inlet, through said circuit channel, and out of said slot film hole.

6. The method of claim 5, wherein said fabricating said plurality of microcircuits comprises the steps of:
   fashioning a refractory metal into the form of said plurality of said microcircuits;
   inserting said refractory metal into a mold for casting said part; and
   removing said refractory metal from said part after casting.

* * * * *